Jan. 16, 1945.　　　　J. N. GOOD　　　　2,367,575
PROTECTION MEANS
Filed April 1, 1942　　　2 Sheets-Sheet 2
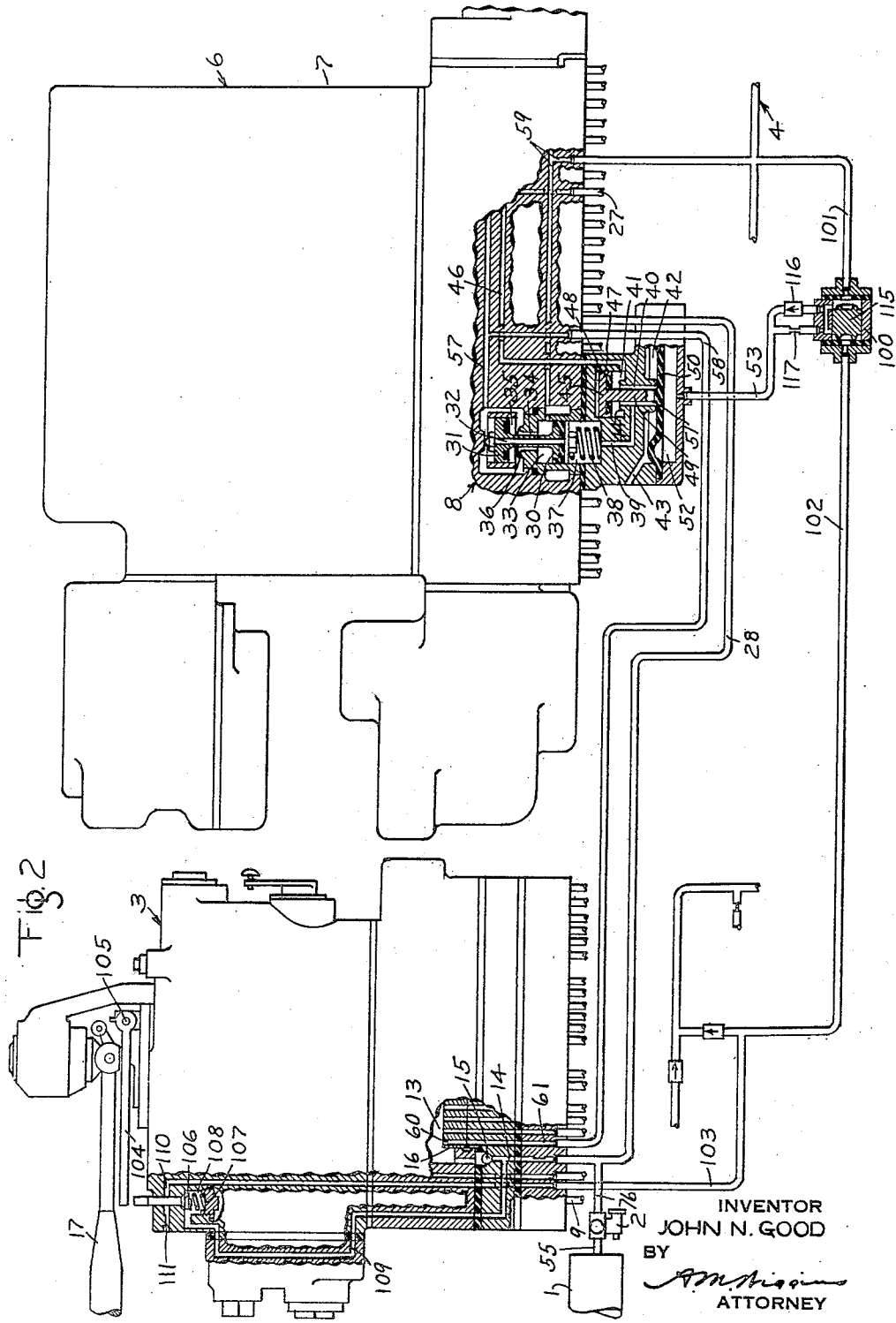
INVENTOR
JOHN N. GOOD
BY
ATTORNEY

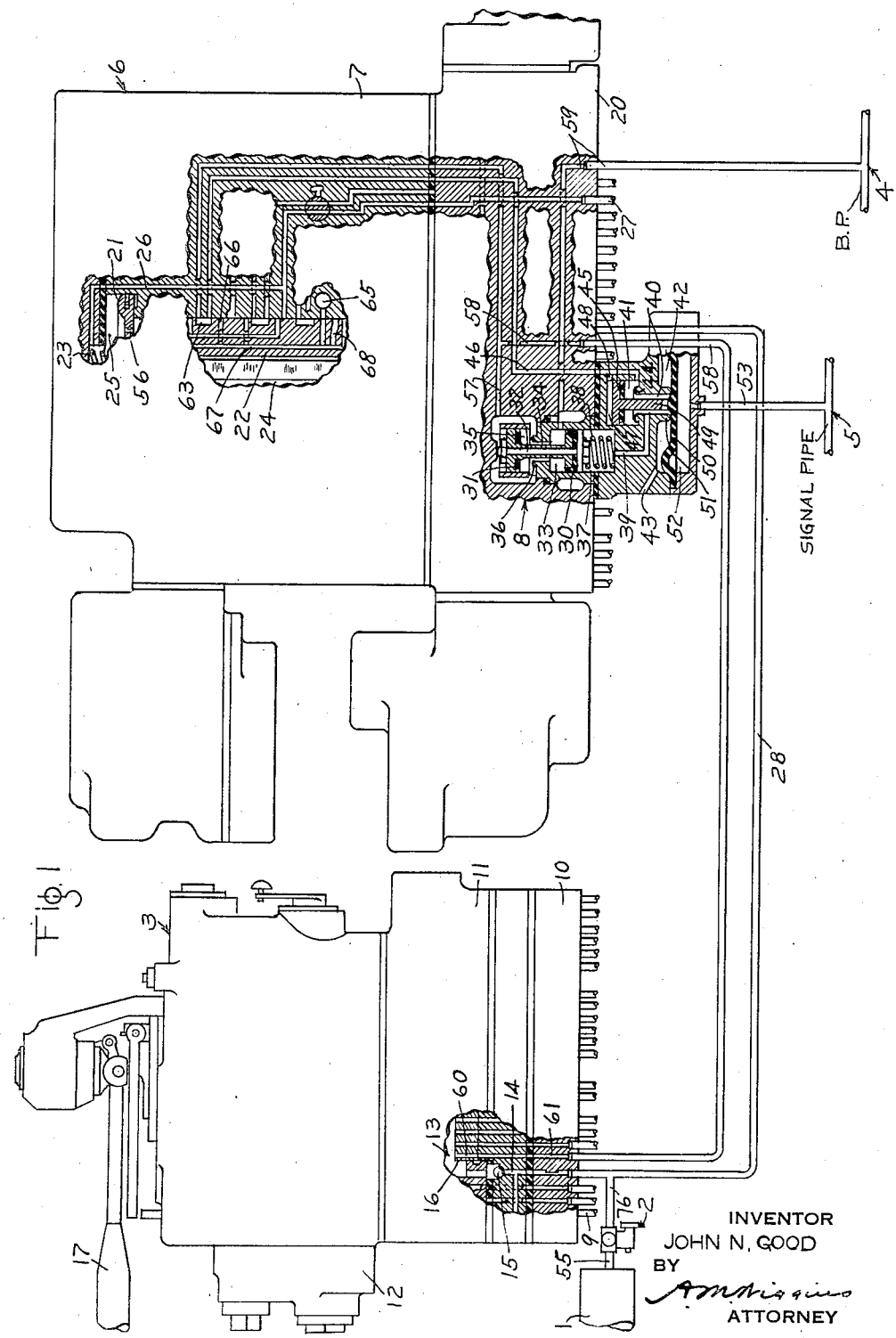

UNITED STATES PATENT OFFICE 2,367,575

PROTECTION MEANS

John N. Good Wilmerding, Pa., assignor to The Westinghouse Air Brake Company, Wilmerding, Pa., a corporation of Pennsylvania Application April 1, 1942, Serial No. 437,211

23 Claims. (Cl. 303—18)

This invention relates to protection means for fluid pressure brakes, and more particularly for locomotive fluid pressure brakes.

For controlling the fluid pressure brakes on a train, the locomotive is provided with a brake valve device, having a normal release or running position in which fluid under pressure is supplied from the main reservoir to the brake pipe by way of a feed valve device, to maintain the pressure in the brake pipe at a predetermined degree.

Sometimes on a long train, a section of the train may become detached without the engineer becoming aware of the fact, thus opening the brake pipe to the atmosphere. If, under such conditions, the brake valve device is not moved from the normal release or running position to a position to cut off the flow of fluid from the main reservoir to the brake pipe, the flow of fluid from the reservoir will continue until the reservoir pressure is depleted or reduced so low as to make it unsafe for the train to proceed.

It is the principal object of the invention to provide improved means for automatically cutting off the flow of fluid from the main reservoir to the brake pipe in the event of an undesired parting of the train, with the brake valve device in normal release or running position.

As is well known by those skilled in the art some locomotive brake equipments employ means controlled by traffic or signal conditions in a railway system for controlling the brakes on the locomotive and cars of a train independently of the usual automatic brake valve device.

In Patent No. 2,256,283, issued to Ellis E. Hewitt and Donald L. McNeal on September 16, 1941, there is disclosed apparatus of the above type which embodies an engineer's brake valve device operative manually to control the brakes on the train and an automatic train control valve device comprising an application valve device which is adapted to respond to an unfavorable track signal to automatically effect a reduction in brake pipe pressure to apply the brakes on the train.

The automatic train control valve device is also provided with a brake pipe cut-off valve device for controlling the supply of fluid under pressure to the brake pipe in running position of the brake valve device and is controlled by the application valve device, whereupon operation of the application valve device in response to an unfavorable track signal to effect a reduction in brake pipe pressure, the cut-off valve device is operative to cut off the supply of fluid under pressure from the main reservoir to the brake pipe by way of the feed valve device. However, in the event that there is a break-in-two of the train or if the brake pipe should become ruptured, the brake pipe cut-off valve device will not operate to cut off the supply of fluid under pressure to the brake pipe unless a brake application has been initiated by the brake application valve device as above described.

Another object of the invention is therefore to provide an improved cut-off valve device of this type which is operative to cut off the flow of fluid from the main reservoir to the brake pipe in the event of a break-in-two of the train.

Still another object of the invention is to provide an improved cut-off valve device so designed and constructed as to cut off the flow of fluid to the brake pipe upon either operation of the application valve device to initiate an application of the brakes or in the event of a break-in-two of the train.

Other objects and advantages will be apparent from the following more detailed description of the invention.

In the accompanying drawings Fig. 1 is a diagrammatic view partly in section of a locomotive brake equipment embodying one form of the invention.

Fig. 2 is a diagrammatic view partly in section of a locomotive brake equipment embodying another form of the invention.

Except for the improvements therein, the apparatus shown in the drawings may be the same as that disclosed in the above referred to Hewitt and McNeal patent, and for the sake of simplicity and ease of understanding only those parts which are considered essential to a complete and comprehensive understanding of the invention will be described.

*Description of the embodiment shown in Fig. 1*

As shown in Fig. 1 of the drawings, the locomotive brake equipment comprises a main reservoir 1, a feed valve device 2, an engineer's brake valve device 3, a brake pipe 4, a train signal pipe 5, an automatic train control valve device 6 having an application valve portion 7 and a brake pipe cut-off valve portion 8.

The main reservoir 1 is of the usual well known type constructed and arranged to store fluid under pressure which is supplied thereto by the usual compressor, not shown.

The feed valve device 2 is of standard construction and operative in the usual manner to supply fluid from the main reservoir 1 to the engineer's brake valve device 3 at a reduced pressure.

The engineer's brake valve device 3, which is provided for manual operation to control the brakes on the locomotive and cars of a train either by straight air through a control pipe 9 or automatically through the medium of brake pipe 4, is substantially the same as that disclosed in Patent 2,106,483 issued to Ellis E. Hewitt on January 25, 1938. Accordingly, only those parts of the engineer's brake valve device 3 are shown in the drawings which are essential to the operation and a clear understanding of the present invention.

As shown in Fig. 1 of the drawings, the engineer's brake valve device 3 comprises a pipe bracket 10 upon which is mounted a rotary valve casing section 11 which supports a straight air application and release valve portion 12. The rotary valve casing section 11 has a chamber 13 which is connected through a passage 14 containing a ball check valve 15 to a feed valve pipe 16, which pipe is adapted to be supplied with fluid, at a reduced pressure, from the main reservoir 1 by operation of the feed valve device 2.

In chamber 13 there is provided a rotary valve 16 for controlling the brakes on the locomotive and a train in the usual manner through variations in the pressure of fluid in the brake pipe 4 upon operation of the valve to the different control positions by the engineer through the use of a brake valve handle 17.

The automatic train control valve device 6 comprises a pipe bracket 20 in which there is included in the brake pipe cut-off valve portion 8, and upon which is mounted the application valve portion 7. This automatic train control valve device may be similar to that disclosed in our Patent 2,256,283 issued September 16, 1941, and the description thereof will therefore be limited to only those parts which are required for a clear understanding of the present invention.

The brake application valve portion 7 comprises a piston 21, a slide valve 22 movable with said piston, and a spring 23 acting on said piston for moving same and the slide valve 22 to their normal position in which they are shown. The slide valve 22 is contained in a valve chamber 24 which is normally charged with fluid under pressure from the feed valve device 2 in the usual manner through a pipe 28 and the usual passages in the pipe bracket portion 20 and the application valve portion of the train control valve device. At the opposite side of the piston 21 there is provided a chamber 25 which contains the spring 23 and which is connected to a passage 26 leading to a pipe 27 which is adapted to be connected to means (not shown) controlled by changes in signal indications along the trackway.

When the track signal is favorable the signal controlled means just referred to is adapted to close a vent from the pipe 27 so that said pipe and thereby the chamber 25 may be charged with fluid by way of a restricted charging port 56 in the piston 21, at the same pressure as that acting in valve chamber 24. In case the track signal becomes unfavorable the signal controlled means referred to is adapted to vent pipe 27 and thereby vent fluid under pressure from the chamber 25 so that fluid at feed valve pressure acting in the valve chamber 24 will move the piston 21 and thereby the slide valve 22 from their normal position to an application position for effecting an automatic application of the brakes on the train. The application position may be defined by engagement of piston 21 with the end wall of chamber 25. When the signal condition again becomes favorable the piston chamber 25 will again be charged with fluid under pressure through the port 56, and spring 23 will then move the piston 21 and slide valve 22 back to their normal position. A further description of the control of the application piston 21 and slide valve 22 is not considered essential in the present application.

The cut-off valve portion 8 comprises a piston 30, a cut-off valve 31 connected to said piston by a stem 32 which extends through a chamber 33 at one side of said piston and through a bore 34 connecting said chamber to a chamber 35 containing the valve 31.

The chamber 35 is in constant open communication with a passage 57 leading to the seat for the slide valve 22 in the application valve portion, which passage is connected to a passage and pipe 58 leading to the engineer's brake valve device 3. The chamber 33 is in constant open communication with the brake pipe 4 by way of a passage and pipe 59.

In chamber 35 there is provided a seat rib 36 encircling the bore 34. This seat rib is provided for engagement by the cut-off valve 31 to close communication between the chamber 35 and the bore 34 open to chamber 33. At the opposite side of piston 30 there is provided a chamber 37 containing a spring 38 acting on the piston for urging same and thereby the cut-off valve 31 to the position in which they are shown in which position said valve is spaced from seat rib 36 establishing communication between chambers 33 and 35.

The chamber 37 is connected by way of a passage 39 to a bore 40, which bore is open at one end to a chamber 41 and at the opposite end to a chamber 42 which latter chamber is connected to the atmosphere by way of a passage 43. In chamber 41 there is provided a seat rib 44 which encircles one end of the bore 40 and which is arranged for engagement by a valve piston 45 to close communication between chamber 41 and the bore 40. The chamber 41 is connected to a passage 46 leading to the seat for the slide valve 22 in the application valve portion 7. At the outer or face side of the valve piston 45 there is provided a chamber 47 which is also connected to passage 46 by way of a passage 48.

The valve piston 45 is provided with a stem 49 which extends through bore 40 and chamber 42 and at its end engages one face of a flexible diaphragm 50 which, together with the casing forms the chamber 42. The diaphragm 50, due to its inherent elasticity is adapted to engage a seat rib 51 contained in chamber 42 and encircling one end of the bore 40 to close communication between chamber 42 and the bore 40.

At the opposite side of the diaphragm 50 there is provided a chamber 42 which is in constant open communication with a pipe 53 leading to the train signal pipe 5.

*Operation of the embodiment shown in Fig. 1*

In operation fluid under pressure is supplied in the usual manner to the main reservoir 1, and from thence flows to a pipe 55 leading to the feed valve device 2. The feed valve device operates to supply fluid from the main reservoir pipe 55 to the feed valve pipe 76 at a pressure desired to be carried in the brake pipe 4. Fluid pressure thus supplied to pipe 76 flows through passage 14 and past ball check valve 15 in the brake valve device 3 to the rotary valve chamber 13 and also flows through pipe 28 to the slide valve chamber 24 in the application valve portion of the train control valve device as will be understood.

Fluid under pressure thus supplied to chamber 24 flows through the restricted port 56 in the piston 21 to chamber 25, and assuming that the means (not shown) controlled by track signals is in condition to permit the train to operate, the fluid pressure in chamber 25, passage 26 and pipe 27 equalizes with that in valve chamber 24 and thus permits the spring 23 to hold the application piston 21 and slide valve 22 in their normal position as shown.

With the brake valve handle 17 and thereby the rotary valve 16 in their normal or running position shown, fluid supplied to rotary valve chamber 13 flows through a port 60 in said valve to a passage 61 and thence through connected pipe and passage 58 and passage 57 to the cut-off valve chamber 35 in the train control valve device and also to the seat of the slide valve 22. In the release position of the slide valve 22, a cavity 63 in the valve connects the passage 57 to the passage 46. With this connection established fluid under pressure supplied to passage 57 flows to chamber 41 in the brake pipe cut-off valve portion. At the same time fluid under pressure flows from passage 46 to chamber 47 by way of connected passage 48.

In initially charging the equipment fluid under pressure is supplied to the train signal pipe 5 in the usual well known manner, from whence it flows by way of pipe 53 to the chamber 52 in the brake pipe cut-off valve portion. Fluid under pressure supplied to chamber 52 causes the diaphragm 50 to flex upwardly into sealing engagement with the seat rib 51. The upward movement of the diaphragm acting through the stem 49 to unseat the valve 45 from the seat rib 44.

Since the diaphragm 50 is maintained in sealing engagement with the seat rib 51, by signal pipe pressure, communication between the bore 40 and the chamber 42 is closed, thus the valve 45 is maintained in its unseated position as shown in Fig. 1 of the drawings, and fluid under pressure supplied to chamber 41 flows therefrom past the unseated valve 45 to the bore 40 from whence it flows to the chamber 37 by way of passage 39. The chamber 37 is thereby charged with fluid at feed valve pressure, which fluid pressure acting in conjunction with the pressure of spring 38 on piston 30 moves the piston and thereby the cut-off valve 31 to the open position as shown in the drawings. In this position of the cut-off valve 31, fluid at feed valve pressure, supplied to chamber 35, flows through bore 34 to chamber 33 and from thence to the brake pipe by way of passage and pipe 59 for charging the brake pipe on the locomotive and cars of the train.

*Application of the brake in response to change in signal indication*

If when the brake valve handle 17 is in release position and the brakes on the locomotive and train are released, the traffic conditions become unfavorable, the consequent change in signal indication acts to effect venting of fluid under pressure from the application piston chamber 25 through passage 26 and pipe 27, and as a result the pressure in the valve chamber 24 moves the piston 21 and thereby the slide valve 22 from their normal position, in which they are, shown, to their application position.

In the application position of the slide valve 22 passage 46 leading to the chambers 41 and 47 in the brake pipe cut-off valve portion 7 is connected to an atmospheric passage 65 by way of passages 66, 67, and 68 in the slide valve. With this communication established fluid under pressure in chamber 37 is vented to the atmosphere by way of passage 39 in the brake pipe cut-off valve portion, bore 40, past unseated valve 45, chamber 41, passage 46, passages 66, 67, and 68 in the slide valve 22 and atmospheric passage 65. The reduction in the pressure in chamber 37 due to the venting of fluid under pressure therefrom as just described, permits brake pipe pressure acting in chamber 33 to move the piston 30 in a direction to pull the cut-off valve 31 into engagement with seat rib 36, thereby cutting off the supply of fluid under pressure from the main reservoir to the brake pipe 4 by way of the rotary valve 16. As a result of this reduction in brake pipe pressure a service application of the brakes on the train is automatically obtained in the manner fully described in the aforementioned Hewitt and McNeal patent. Since this invention is not concerned with the operation of the equipment to effect a service application of the brakes it is therefore deemed unnecessary to describe the operation.

From the above it will be apparent that, in the event of a sudden reduction in brake pipe pressure, caused, for instance, by a ruptured brake pipe during the time application of the brakes is being effected by the operation of the automatic train control valve device in response to a change in signal indication, the brake pipe cut-off valve 6 will operate to prevent loss of fluid under pressure from the main reservoir 1.

When it is desired to effect a release of the brakes, after an application has been effected by the automatic train control valve device, and the equipment is conditioned therefore, the brake pipe will be recharged with fluid under pressure in the manner hereinbefore described in connection with initially charging.

If the train should part, the train signal pipe pressure will be reduced and consequently the pressure in chamber 52 of the brake pipe cut-off valve portion 7 in the train control valve device 6 will be likewise reduced. Upon reduction in the pressure of fluid in chamber 52 the pressure of fluid in the bore 40 will cause the diaphragm 50 to flex downwardly, out of engagement with the seat rib 51 and thereby establish communication between the bore 40 and the chamber 42. Downward movement of diaphragm 50 will permit the valve 45 to move downwardly into seating engagement with the seat rib 44 thus cutting off communication between the bore 40 and the chamber 41.

If the engineer's brake valve device is in release position and the associated parts of the brake equipment and the brake pipe are charged with fluid under pressure when parting of the train occurs the chamber 37 in the brake pipe cut-off valve will be vented to the atmosphere by way of passage 39, bore 40, chamber 42 and passage 43. As hereinbefore described, venting of fluid under pressure from chamber 37 permits brake pipe pressure acting in chamber 33 to move the piston 30 in a direction to pull the cut-off valve 37 into engagement with seat rib 36 thereby cutting off the supply of fluid under pressure from the rotary valve 16 to the brake pipe 4 and, as a consequence, stops the flow of fluid under pressure from the main reservoir to the brake pipe until the pressure is again restored in chamber 52.

If the train should part at a time when the cut-off valve 31 is in its cut-off position by reason of operation of the application valve, as previously described, the venting of fluid under pressure from chamber 52 will insure that the cut-off valve 31 will be maintained closed until the pressure is again restored in the train signal pipe and chamber 52.

From the foregoing description it will be apparent that the brake pipe cut-off valve device 8 is operative to cut-off the supply of fluid under pressure from the main reservoir 1 to the brake pipe 4 upon either the operation of the application valve portion 7 of the train control valve device 7 or by a break-in-two of the train.

*Description of the embodiment shown in Fig. 2*

In Fig. 2 there is illustrated another form of the invention shown in Fig. 1 in which certain modifications are made in the piping arrangement leading to the brake pipe cut-off valve portion 8 of the automatic train control valve device 6. For simplicity, corresponding parts and pipes of the two embodiments will be designated by the same reference numerals without further description and only those parts provided in Fig. 2 which are not provided in the previous embodiment will be described.

In this embodiment of the invention, the train signal pipe 5 which is connected to the pipe 53 in the first embodiment of the invention is omitted and a double check valve device 100 is employed which is constructed and arranged to selectively connect the pipe 53, leading to the chamber 52 of the brake pipe cut-off valve portion 8, to either a pipe 101 connected to one end of the check valve device and leading to the brake pipe 4 or to a pipe 102 connected to the opposite end of the check valve device and leading to the usual locomotive sanding pipe 103. It will be noted that the pipe 53 is connected to the side outlet passage of the check valve device through a uniflow check valve 116 and also through a restricted communication 117 which by-passes the check valve 116 for a reason hereinafter described.

In this embodiment of the invention the automatic train control valve device 6 is identical with that shown and described in the previous embodiment and for this reason no further description here is deemed necessary.

The engineer's brake valve device is also identical to that shown in the previous embodiment and, as before mentioned, in connection with the previous embodiment, may be of the type disclosed in Patent No. 2,106,483 issued to Ellis E. Hewitt on January 25, 1938.

As is well known by those skilled in the fluid pressure brake art, the operating handle is of the safety control type which is movable in a vertical plane, and is operative upon downward movement from the normal position shown, in all brake controlling positions of the handle, to actuate a sanding bail 104 which is mounted to pivot on a shaft 105 secured in the brake valve casing. The sanding bail is arranged to engage the stem of a sand valve 106 upon downward movement of the bail for unseating said valve against the opposing force of a spring 107, the spring being provided for seating the valve 106 upon return of the handle 17 to its normal position.

The sand valve is contained in a chamber 108 which is connected by way of a passage 109 to the fluid pressure supply passage 14 which, as described in the first embodiment, is supplied with fluid from the main reservoir 1 at a reduced pressure through the feed valve device 2. The stem of the valve 106 extends through a passage 110 which is connected to the sand pipe 103, which passage is also connected to the atmosphere by way of a restricted passage 111. The valve 106 when unseated admits fluid under pressure from chamber 108 to the passage 110, from which passage fluid under pressure flows to the atmosphere at a restricted rate through passage 111 and also flows to the sand pipe 103. When seated the valve 106 prevents the flow of fluid from chamber 108 to passage 110. The restricted atmospheric passage 111 is provided for the purpose of normally maintaining the sand pipe 103 and pipe 102 at atmospheric pressure. It will be apparent that this atmospheric communication from the passage 110 will prevent leakage of fluid past the valve 106 when the valve is seated from building up a pressure in the pipes 103 and 102 and consequently in the check valve chamber which is open to the pipe 102.

*Operation of the embodiment shown in Fig. 2*

It will be understood that fluid under pressure supplied from the feed valve device 2 to the passage 14 in the manner hereinbefore described, flows to chamber 108 by way of passage 109. It will also be understood that with the brake valve handle 17 in release position as shown, and the automatic train control valve device in its release position, the cut-off valve 31 of the brake pipe cut-off valve portion 8 will be unseated and fluid under pressure will flow from the passage 57 to the brake pipe 4 in a manner already described in connection with the embodiment of the invention shown in Fig. 1 of the drawings.

Fluid under pressure thus supplied to the brake pipe 4 flows therefrom to the pipe 101 leading to one side of the check valve device 100. The fluid pressure in pipe 101 then shifts a double check valve 115 in the device to a position for closing communication between pipe 102 and pipe 53 and for connecting the pipe 10 to the pipe 53, whereupon fluid flows from pipe 101 past the right hand end of the check valve 115, as viewed in the drawings, and through uniflow check valve 116, side outlet passage to the pipe 53. At the same time fluid supplied to the side outlet passage of the check valve 100 flows through the restricted passage 117 to the pipe 53. Fluid under pressure thus supplied to pipe 53 flows therefrom to the chamber 52 in the brake pipe cut-off valve portion 8 causing the diaphragm 50 to be maintained in engagement with the seat rib 51 to maintain closed the communication between bore 40 and chamber 42.

Operation of the application portion 7 of the train control valve device 6 to application position to effect an application of the brakes will operate in the same manner as hereinbefore described to vent fluid under pressure from chamber 37 in the brake pipe cut-off valve device to cause the cut-off valve 31 to close communication from the main reservoir 1 to the brake pipe 4.

If the pressure of fluid in the brake pipe is suddenly reduced, for instance, by a ruptured brake pipe or by a parting of the brake pipe hose of the train, the pressure in pipe 101 will reduce correspondingly, and as a consequence the pressure in chamber 52 is reduced by way of pipe 53, restricted passage 117 and past the unseated end of the check valve 115. A reduction in pressure in chamber 52 permits the fluid at brake pipe pressure acting in bore 40 to move the diaphragm 50 out of engagement with the seat 51, thus venting fluid under pressure from chamber 37 to cause the cut-off valve to close communication between the main reservoir 1 and the brake pipe in the manner already described in connection with Fig. 1 of the drawings.

It will be noted that the flow of fluid under pressure from chamber 52 to the pipe 101 is controlled by the restricted passage 117 so as to delay, for an interval of time, operation of the brake pipe cut-off valve in the event of a slight over reduction in brake pipe pressure during a service brake application.

From the foregoing description of the operation of the embodiment shown in Fig. 2 it will be understood that a sudden reduction in brake pipe pressure causes the brake pipe cut-off valve portion of the automatic train control valve device 6 to operate automatically to cut off the flow of fluid under pressure from the main reservoir 1 to the brake pipe 4. From this it will be apparent that main reservoir pressure cannot be depleted nor can the brakes on the head end of the train be released, when an emergency application of the brakes is effected, by flow of fluid under pressure from the main reservoir to the brake pipe.

If, at any time, the operator desires to recharge the brake pipe and thereby effect a release of the brakes following an emergency application, he may depress the brake valve handle 17 and thereby operate the bail 104 to move the valve stem in a downwardly direction for unseating the sand valve 106. When the sand valve 106 is unseated, fluid from the supply passage 14 flows to chamber 108 and then past unseated valve 106 to passage 110.

Fluid under pressure thus supplied to passage 110 flows to the left hand side of the check valve device 100 as viewed in the drawings by way of sand pipe 103 and connected pipe 102. The fluid pressure in pipe 102 then shifts the double check valve 115 from the position in which it is shown to a position for closing communication between pipe 101 and pipe 53 and for connecting the pipe 102 to the pipe 53. With this communication established fluid flows from the pipe 102 to the chamber 52 past the unseated end of the check valve 115, past uniflow check valve 116 and also through the restricted passage 117 to the pipe 53.

Upon an increase in the pressure of fluid in chamber 52 the diaphragm 50 is moved into sealing engagement with the seat rib 51 to cut off communication between the bore 40 and the chamber 42, whereupon fluid under pressure is supplied to the chamber 37 as described in initially charging in connection with the description of the operation of the first embodiment. Fluid under pressure supplied to chamber 37 together with the force of spring 38 causes the cut-off valve 31 to move to its unseated position, thereby again establishing communication between the chambers 33 and 35, so that, with the brake valve handle 17 in release position, fluid under pressure will be supplied from the main reservoir 1 to the brake pipe 4 as previously described.

Having now described my invention, what I claim as new and desire to secure by Letters Patent, is:

1. In a fluid pressure brake equipment for a train of vehicles, in combination, a main reservoir, a brake pipe, a feed valve device, an engineer's brake valve device having a release position in which fluid under pressure may flow from the feed valve device to the brake pipe, valve means controlling communication through which fluid supplied by the feed valve device flows from said brake valve device to said brake pipe, means responsive to an unfavorable track signal to effect operation of said valve means to close said communication, a normally charged control pipe arranged to be vented of fluid under pressure incident to a break-in-two of the train to effect a reduction in the pressure of fluid therein, and means responsive to the reduction in pressure in said control pipe to also effect operation of said valve means to close said communication.

2. In a fluid pressure brake equipment, in combination, a brake pipe, a brake valve device having a position for establishing a communication through which fluid under pressure is supplied to said brake pipe, a valve for controlling said communication, a piston connected to said valve and having at one side a chamber connected to said brake pipe and having at the opposite side a chamber adapted to be supplied with fluid under pressure, a spring in the second mentioned chamber operative upon equalization of pressures in the two chambers to effect operation of said piston to open said valve, means responsive to an unfavorable track signal to vent fluid under pressure from the second mentioned chamber for rendering said piston operable by brake pipe pressure to close said valve, a control pipe normally charged with fluid under pressure, and means responsive to a reduction in pressure in said control pipe to also vent fluid under pressure from the second mentioned chamber for rendering said piston operable by brake pipe pressure to close said valve.

3. In a fluid pressure brake equipment, in combination, a brake pipe, a brake valve device having a position for establishing a communication through which fluid under pressure may be supplied to said brake pipe, a cut-off valve for controlling said communication, a valve mechanism having a normal position for effecting operation of said cut-off valve to open said communication and movable to another position for effecting operation of said cut-off valve to close said communication, a control pipe normally charged with fluid under pressure, and valve means subject to the pressure of fluid in said control pipe and operative upon a reduction in the pressure of fluid in said control pipe for also effecting operation of said cut-off valve to close said communication.

4. In a fluid pressure brake equipment for a train comprising a plurality of coupled vehicle units, in combination, a brake pipe, a brake valve device having a position for establishing a communication through which fluid under pressure may be supplied to said brake pipe, a cut-off valve for controlling said communication, a valve mechanism having a normal position for effecting operation of said cut-off valve to open said communication and movable to another position for effecting operation of said cut-off valve to close said communication, a control pipe normally charged with fluid under pressure, said control pipe being arranged to be vented of fluid under pressure upon the parting of two of said coupled vehicle units of the train to effect a reduction in the pressure of fluid therein, and valve means subject to the pressure of fluid in said control pipe and operative upon the reduction in the pressure of fluid in said control pipe for effecting operation of said cut-off valve to close said communication with said valve mechanism in its normal position.

5. In a fluid pressure brake equipment, in combination, a brake pipe, a brake valve device for supplying fluid under pressure to said brake pipe, a cut-off valve for controlling communication through which fluid is supplied from said brake valve device to said brake pipe, a chamber a piston connected to said cut-off valve and responsive to the pressure of fluid in said chamber, means responsive to a favorable signal indication for supplying fluid under pressure to said chamber for rendering said piston operative to open said cut-off valve and responsive to an unfavorable signal indication for venting fluid under pressure from said chamber for rendering said piston operative to close said cut-off valve, valve means having a normal position for opening communication between said chamber and said means and movable to another position for closing communication between said chamber and said means and for opening communication between said chamber and the atmosphere for rendering said piston operative to close said cut-off valve even though the first mentioned means is responsive to a favorable signal indication, and means including a flexible diaphragm responsive to fluid under pressure supplied thereto for maintaining said valve means in its normal position and upon the release of fluid under pressure therefrom for moving said valve means to said other position.

6. In a fluid pressure brake equipment, in combination, a brake pipe, a brake valve device for supplying fluid under pressure to said brake pipe, a cut-off valve for controlling communication through which fluid is supplied from said brake valve device to said brake pipe, a chamber, a piston connected to said cut-off valve and responsive to the pressure of fluid in said chamber, means responsive to a favorable signal indication for supplying fluid under pressure to said chamber for rendering said piston operative to open said cut-off valve and responsive to an unfavorable signal indication for venting fluid under pressure from said chamber for rendering said piston operative to close said cut-off valve, valve means having a normal position for opening communication between said chamber and said means and movable to another position for closing communication between said chamber and said means and for opening communication directly from said chamber to the atmosphere for rendering said piston operative to close said cut-off valve even though said means is responsive to a favorable signal indication, a control pipe normally charged with fluid under pressure a movable abutment responsive to the pressure of fluid in said control pipe for controlling the operation of said valve means, said abutment being operative upon an increase in fluid pressure in said control pipe for operating said valve means to its normal position and being operative upon a decrease in fluid pressure in said control pipe for operating said valve means from its normal position to said other position.

7. In a fluid pressure brake equipment, in combination, a brake pipe, a brake valve device having a position for establishing a communication through which fluid under pressure is supplied to said brake pipe, valve means controlling said communication, means responsive to an unfavorable track signal to effect operation of said valve means to close said communication, a train signal pipe normally charged with fluid under pressure, and means responsive to a reduction in pressure in said signal pipe to also effect operation of said valve means to close said communication.

8. In a fluid pressure brake equipment, in combination, a brake pipe, a brake valve device having a position for establishing a communication through which fluid under pressure is supplied to said brake pipe, valve means controlling said communication, means responsive to an unfavorable track signal to effect operation of said valve means to close said communication, a train signal pipe normally charged with fluid under pressure, and means including a flexible diaphragm responsive to the pressure of fluid in said signal pipe and operative upon a reduction in pressure in said signal pipe to also effect operation of said valve means to close said communication.

9. In a fluid pressure brake equipment, in combination, a brake pipe, a brake valve device for supplying fluid under pressure to said brake pipe, a communication through which fluid under pressure is supplied from said brake valve device to said brake pipe, valve means having a normal position for opening said communication and movable to another position for closing said communication, piston means for actuating said valve means from said normal position to said other position, a signal pipe normally charged with fluid under pressure, means operative incident to an unfavorable track signal to cause said piston means to actuate said valve means from said normal position to said other position, and means operative incident to a reduction in signal pipe pressure to also cause said piston means to actuate said valve means from said normal position to said other position.

10. In a fluid pressure brake equipment, in combination, a brake pipe, a brake valve device for supplying fluid under pressure to said brake pipe, a cut-off valve for controlling communication through which fluid is supplied from said brake valve device to said brake pipe, a valve mechanism having a normal position for effecting operation of said cut-off valve to open said communication and movable to another position for effecting operation of said cut-off valve to close said communication, a signal pipe normally charged with fluid under pressure, and valve means subject to the pressure of fluid in said signal pipe and operative upon a reduction in the pressure of fluid in said signal pipe for effecting operation of said cut-off valve to close said communication with said valve mechanism in its normal position.

11. In a fluid pressure brake equipment, in combination, a brake pipe, a brake valve device for supplying fluid under pressure to said brake pipe, a cut-off valve for controlling communication through which fluid is supplied from said brake valve device to said brake pipe, a chamber, a piston for actuating to said cut-off valve, a valve mechanism having one position for supplying fluid under pressure to said chamber for effecting the operation of said piston to open said cut-off valve and having another position for venting fluid under pressure from said chamber for effecting the operation of said piston to close said cut-off valve, means having a first position for opening communication between said valve mechanism and said chamber and a second position for closing communication between said valve mechanism and said chamber and for at the same time opening communication directly from said chamber to the atmosphere for rendering said piston operative to close said cut-off valve even though said valve mechanism is in said one position, a signal pipe normally charged with fluid under pressure, and fluid pressure responsive means operative upon a decrease in signal pipe pressure for effecting operation of said means to said second position and upon an increase in pressure in said signal pipe for effecting operation of said means to said first position.

12. In a fluid pressure brake equipment, in combination, a brake pipe, a brake valve device having a position for establishing a communication through which fluid under pressure is supplied to said brake pipe, valve means controlling said communication, means responsive to an unfavorable track signal to effect operation of said valve means to close said communication, a control pipe normally charged with fluid under pressure from said brake pipe, means responsive to a reduction in pressure in said control pipe to also effect the operation of said valve means to close said communication, and means interposed between said control pipe and said brake pipe for controlling the rate of reduction in pressure in said control pipe upon a sudden reduction in brake pipe pressure.

13. In a fluid pressure brake equipment, in combination, a brake pipe, a brake valve device having a position for establishing a communication through which fluid under pressure is supplied to said brake pipe, valve means controlling said communication, means responsive to an unfavorable track signal to effect operation of said valve means to close said communication, a control pipe normally charged with fluid under pressure from said brake pipe, means responsive to a reduction in pressure in said control pipe to also effect the operation of said valve means to close said communication, and means including a choke interposed between said control pipe and said brake pipe for controlling the rate of reduction in pressure in said control pipe upon a reduction in brake pipe pressure.

14. In a fluid pressure brake equipment, in combination, a brake pipe, a brake valve device having a position for establishing a communication through which fluid under pressure is supplied to said brake pipe, valve means controlling said communication, means responsive to an unfavorable track signal to effect operation of said valve means to close said communication, a control pipe normally charged with fluid under pressure from said brake pipe, a uniflow check valve interposed between said control pipe and said brake pipe for permitting flow of fluid from said brake pipe to said control pipe, means responsive to a reduction in pressure in said control pipe to also effect operation of said valve means to close said communication, and a choke interposed between said control pipe and said brake pipe for controlling the rate of reduction in pressure in said control pipe upon a reduction in brake pipe pressure.

15. In a fluid pressure brake equipment, in combination, a brake pipe, a brake valve device for supplying fluid under pressure to said brake pipe, a cut-off valve for controlling communication through which fluid is supplied from said brake valve device to said brake pipe, a valve mechanism having a normal position for effecting operation of said cut-off valve to open said communication and movable to another position for effecting operation of said cut-off valve to close said communication, a control pipe normally charged with fluid under pressure from the brake pipe, means interposed between the brake pipe and the control pipe for controlling the rate of reduction in pressure in said control pipe upon a reduction in brake pipe pressure, and valve means subject to the pressure of fluid in said control pipe and operative upon a reduction in the pressure of fluid in the control pipe for effecting operation of said cut-off valve to close said communication with said valve mechanism in its normal position.

16. In a fluid pressure brake, in combination, a brake pipe, brake pipe charging control means for supplying fluid under pressure to said brake pipe, a chamber, a cut-off valve controlling communication through which fluid under pressure is supplied from said brake pipe charging means to said brake pipe and operative upon an increase in the pressure of fluid in said chamber to open said communication and upon a reduction in the pressure of fluid in said chamber to close said communication, means operative upon charging of said brake pipe to admit fluid under pressure to said chamber to increase the pressure in the chamber and providing for release of fluid under pressure from said chamber upon a reduction in brake pipe pressure to effect a reduction in the pressure in the chamber, and means operative to supply fluid under pressure to said chamber with said brake pipe vented.

17. In a fluid pressure brake, in combination, a brake pipe, brake pipe charging control means for supplying fluid under pressure to said brake pipe, a chamber, a cut-off valve controlling communication through which fluid under pressure is supplied from said brake pipe charging means to said brake pipe and operative upon an increase in the pressure of fluid in said chamber to open said communication and upon a reduction in the pressure of fluid in said chamber to close said communication, means operative by fluid under pressure in said brake pipe to open said chamber to said brake pipe and operative by fluid under pressure supplied through another pipe with said brake pipe vented to open said chamber to said other pipe, and means for supplying fluid under pressure to said other pipe.

18. In a fluid pressure brake, in combination, a brake pipe, brake pipe charging control means for supplying fluid under pressure to said brake pipe, a chamber, a cut-off valve controlling communication through which fluid under pressure is supplied from said brake pipe charging means to said brake pipe and operative upon an increase in the pressure of fluid in said chamber to open said communication and upon a reduction in the pressure of fluid in said chamber to close said communication, another pipe, a double check valve device having its end outlets open respectively to said brake pipe and said other pipe and its side outlet open to said chamber, and means for supplying fluid under pressure to and releasing fluid under pressure from said other pipe.

19. In a fluid pressure brake, in combination, a brake pipe, brake pipe charging control means for supplying fluid under pressure to said brake pipe, a chamber, a cut-off valve controlling communication through which fluid under pressure is supplied from said brake pipe charging means to said brake pipe and operative upon an increase in the pressure of fluid in said chamber to open said communication and upon a reduction in the pressure of fluid in said chamber to close said communication, another pipe, means for supplying fluid under pressure to and releasing fluid under pressure from said other pipe, and a check valve device operative by the pressure of fluid in said other pipe for connecting said other pipe to and isolating said brake pipe from said chamber.

20. In a fluid pressure brake, in combination, a brake pipe, another pipe, an engineer's brake valve device for supplying fluid under pressure to said brake pipe and also operative to supply fluid under pressure to said other pipe, a chamber, a cut-off valve controlling communication through which fluid under pressure is supplied from said brake valve device to said brake pipe and operative upon an increase in the pressure of fluid in said chamber to open said communication and upon a decrease in the pressure of fluid in said chamber to close said communication, means operative by fluid under pressure in said brake pipe to admit fluid under pressure from said brake pipe to said chamber and operative when the pressure of fluid in said other pipe is in excess of brake pipe pressure to admit fluid under pressure from said other pipe to said chamber.

21. In a fluid pressure brake in combination, a brake pipe, another pipe normally open to the atmosphere, a brake valve device for supplying fluid under pressure to said brake pipe and comprising a handle which is depressible by the engineer at his discretion for supplying fluid under pressure to said other pipe, a chamber, a cut-off valve controlling communication through which fluid under pressure is supplied from said brake valve device to said brake pipe, and operative upon the supply of fluid under pressure to said chamber to open said communication and upon a release of fluid under pressure from said chamber to close said communication, and a double check valve operative by fluid under pressure in said brake pipe to open said chamber to said brake pipe and operative by fluid under pressure supplied through said other pipe with said brake pipe vented to open said chamber to said other pipe.

22. In a fluid pressure brake equipment comprising a plurality of coupled vehicle units, in combination, a brake pipe, brake pipe charging control means having a position for establishing a communication through which fluid under pressure may be supplied to said brake pipe, valve means for controlling said communication, a valve mechanism having a normal position for effecting operation of said valve means to open said communication and movable to another position for effecting operation of said valve means to close said communication, a normally charged control pipe arranged to be vented of fluid under pressure upon the parting of two coupled vehicle units in a train to effect a reduction in the pressure of fluid therein, and means responsive to the reduction in pressure in said control pipe to also effect operation of said valve means to close said communication.

23. In a fluid pressure brake equipment for a train of coupled vehicles, in combination, a brake pipe, brake pipe charging control means for supplying fluid under pressure to said brake pipe, valve means controlling communication through which fluid is supplied from said brake pipe charging control means to said brake pipe, means having a normal position for effecting operation of said valve means to open said communication and movable to another position for effecting operation of said valve means to close said communication, a normally charged control pipe arranged to be vented of fluid under pressure incident to a break-in-two of the train to effect a reduction in the pressure of fluid therein, and other means responsive to the reduction in pressure in said control pipe to also effect operation of said valve means to close said communication.

JOHN N. GOOD.